United States Patent [19]

Kluth

[11] 3,943,907

[45] Mar. 16, 1976

[54] THROTTLE RETURN SYSTEMS FOR CARBURETTORS

[75] Inventor: Wilhelm Kluth, Jechen, Germany

[73] Assignee: Societe Industrielle de Brevets et D'Etudes S.I.B.E., France

[22] Filed: Apr. 2, 1974

[21] Appl. No.: 457,262

[30] Foreign Application Priority Data

Oct. 19, 1973 France ............................ 73.37435

[52] U.S. Cl. ..... 123/198 DB; 123/198 D; 180/82 R; 74/513

[51] Int. Cl.$^2$ F02B 77/08; F02D 11/04; B60K 22/08

[58] Field of Search ..... 123/198 D, 198 DB, 198 R, 123/142; 74/89.2, 96, 513; 180/82, 82.1

[56] References Cited

UNITED STATES PATENTS

| | | | |
|---|---|---|---|
| 3,626,919 | 12/1971 | MacMillan | 123/198 DB |
| 3,698,372 | 10/1972 | Eshelman et al. | 123/198 D X |
| 3,699,943 | 10/1972 | Eshelman | 123/198 D X |
| 3,704,635 | 12/1972 | Eshelman | 123/198 D X |
| 3,760,786 | 9/1973 | Marsh | 123/198 DB |
| 3,830,213 | 8/1974 | Herman | 123/198 DB |

*Primary Examiner*—Charles J. Myhre
*Assistant Examiner*—Ira S. Lazarus
*Attorney, Agent, or Firm*—Stevens, Davis, Miller & Mosher

[57] ABSTRACT

A carburettor throttle member is provided with two return springs. The first spring is tensioned between the carburettor body and a disk rotatably mounted on the carburettor shaft. The second spring is weaker than the first spring and is compressed between the disk and shaft. The two springs tend to rotate the disk in opposite direction. The first spring normally retains the disk and shaft in a predetermined angular position. In case of fracture of the first spring, the second spring moves the disk into abutment with the fixed stop, operates as a substitute return spring.

8 Claims, 4 Drawing Figures

THROTTLE RETURN SYSTEMS FOR CARBURETTORS

BACKGROUND AND SUMMARY OF THE INVENTION

The invention relates to internal combustion engine carburettors of the kind which comprise, in an intake manifold, a throttling member carried by a rotary shaft and connected to an accelerator control which enables the driver to open such member against the force of resilient return means which act on such shaft and tend to return the throttling member into a minimum opening position corresponding to engine idling.

Such resilient return means have been formed by a single spring which is subjected to a deforming force when the driver opens the throttling member. Safety requirements now lay down that at least two separate return springs must be provided each of which is able to return the throttling member to its idling position. The simplest method would consist in disposing the two springs in parallel, but this would result in practice in doubling the force which the driver must exert to open the throttling member, since each spring must exert force adequate to enable it to reclose the throttling member on its own — i.e., if the other spring breaks.

It is an object of the invention to provide such return means using two springs without however appreciably increasing the force required to open the throttling member and without substantially increasing the complexity of the construction.

To this end, the resilient return means of a carburettor comprises a member rotatable about the shaft carrying the usual throttle member or butterfly valve and two return springs. The first spring is tensioned between said member and the carburettor frame for exerting on said member a force urging it angularly in the direction of closure of said throttle member. Cooperating abutment means on said shaft assembly and member limit the extent of angular movement of said member and shaft under the action of said first spring. The second spring is compressed against said member and exerts a torque tending to rotate it in a direction opposite to that due to said first spring and lower than the torque of said first spring. Last, there is provided stationary abutment means for limiting the extent of movement of said member under the action of said second spring upon failure of said first spring.

The invention will be better understood from the following description with reference to the accompanying drawings, such description and drawings relating to a preferred embodiment.

SHORT DESCRIPTION OF THE DRAWINGS

FIGS. 1 and 2 show, respectively in elevation and as viewed from the right with portions cut away, the lower part of a carburettor whose throttling member occupies its minimum opening position (the first return spring not being shown in FIG. 1); and FIGS. 3 and 4, similar to FIGS. 1 and 2, illustrate another embodiment of the invention.

DESCRIPTION OF PREFERRED EMBODIMENTS

Figure 1:
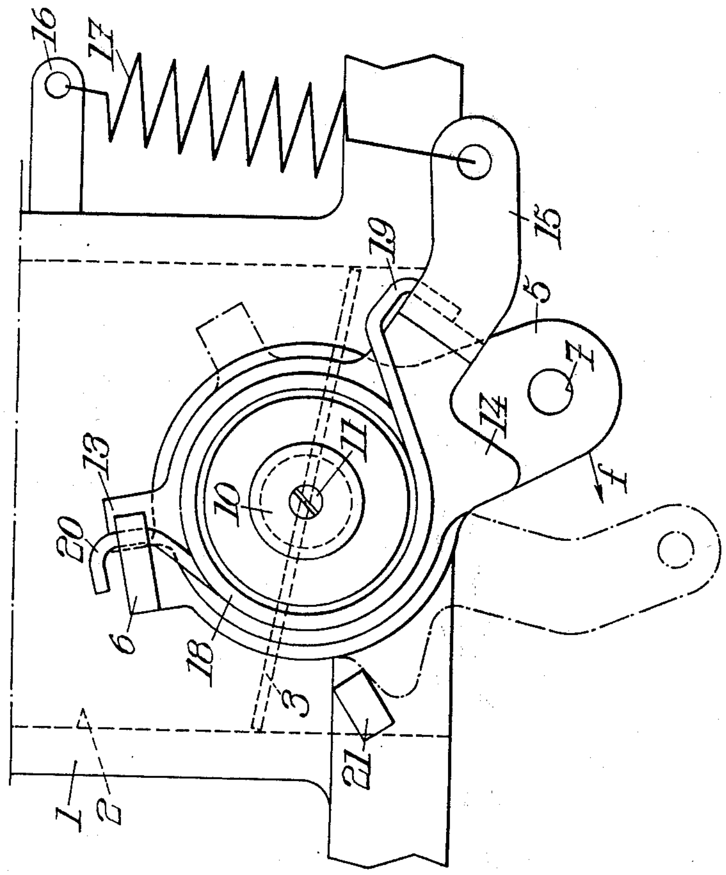
Figure 2:
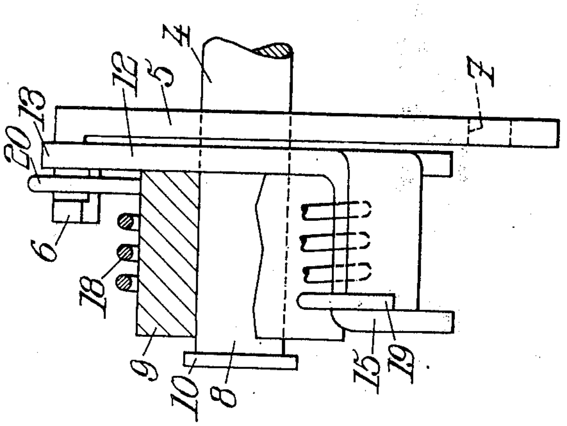

Referring to FIGS. 1–2, a downdraught carburettor comprises a body 1 whose conventional elements are not illustrated. An intake duct 2 extends through the body and contains a throttling member or butterfly 3 secured to a rotary shaft by screws (not shown).

A gas control lever 5 is attached to the shaft 4 by suitable means such as a screw (not shown). An end portion of lever 5 is bent at 90° and constitutes a stop finger 6. An opposite end portion of the lever is formed with a hole 7 for the attachment of a control cable (not shown) connected to the vehicle accelerator pedal. The cable when tensioned may draw lever 5 clockwise (in the direction indicated by arrow *f* in FIG. 1) thereby opening the butterfly 3.

The butterfly shaft 1 has a cylindrical projection 8 extending beyond the lever 5 and on which a rotary bush 9 is rotatably mounted. The bush 9 is retained by a washer 10 secured by a screw 11 or any other detachable locking means; a disk 12 secured to the bush 9 has a generally circular shape from which project two abutment lugs 13, 14 and an offset lug 15 making two successive 90° bends.

A first return spring 17 is tensioned between the lug 15 of the disk 12 and a lug 16 of the carburettor body 1 and biases the disk anticlockwise, thereby resiliently urging the lug 13 into abutment with the finger 6 and returning the butterfly into the minimum opening position in which it is shown in FIG. 1.

The return means also comprises a second spring 18 which is a helical torsion spring wound around the bush 9. One of the end portions 19 of the spring 18 bears against the lug 15; the other end 20 bears against the finger 6 and therefore tends to rotate the lever 5 counterclockwise — i.e., towards the minimum opening position of the butterfly 3.

The stiffness and initial stressing of the return spring 18 are selected for that spring to exert a lower troque than that of the spring 17 so that the latter will normally keep the lug 13 in contact with the finger 6.

The apparatus operates as follows: under normal operation the lever 5 and the disk 12 are moved en bloc either in the opening direction of the butterfly 3 by the accelerator control, or in the closure direction by the return spring 17 when the control is released.

If the spring 17 fails, the torsion spring 18 expands and rotates the disk 12 in the direction indicated by the arrow *f* until the lug 14 abuts a stop 21 carried by the carburettor body (as shown in chain-dot lines in FIG. 1) that stop being located at a place which is not reached in normal operation, even for maximum opening of the butterfly 3. The spring 18 is then supported by the stop 21, resiliently forces the finger 6 out of contact with the lug 13 and returns the lever 5, the shaft 8 and the butterfly 3 to the minimum opening position of the latter when the accelerator control is released.

The springs 17, 18 are preferably so proportioned that the driver will not notice any substantial variation in the resilient return force when the spring 18 is substituted for the spring 17 due to failure of the latter.

Figure 3:
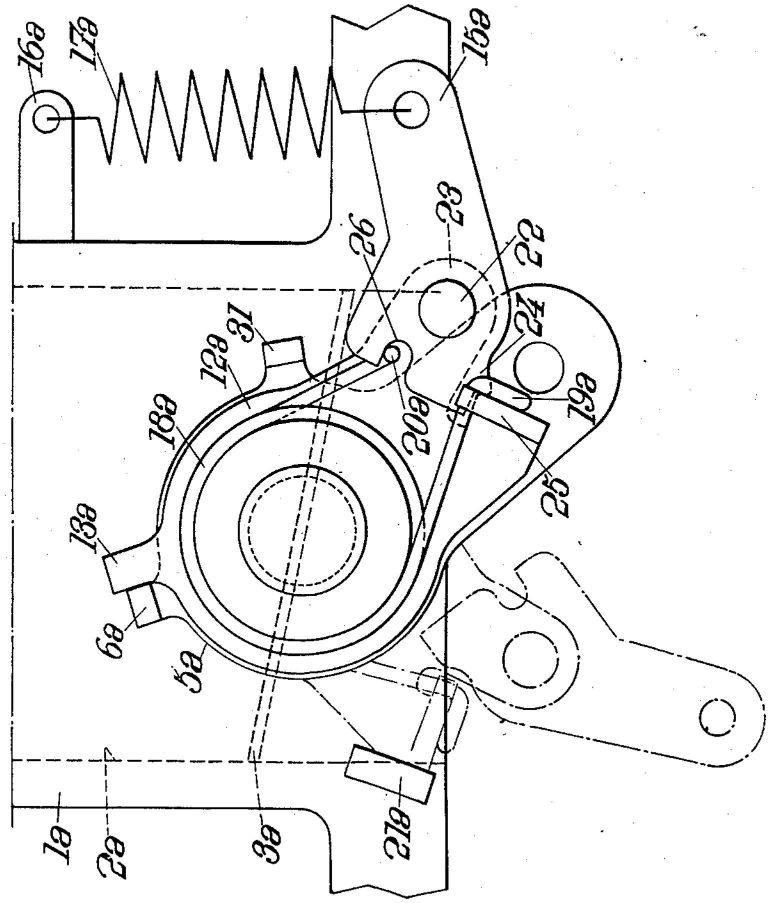
Figure 4:
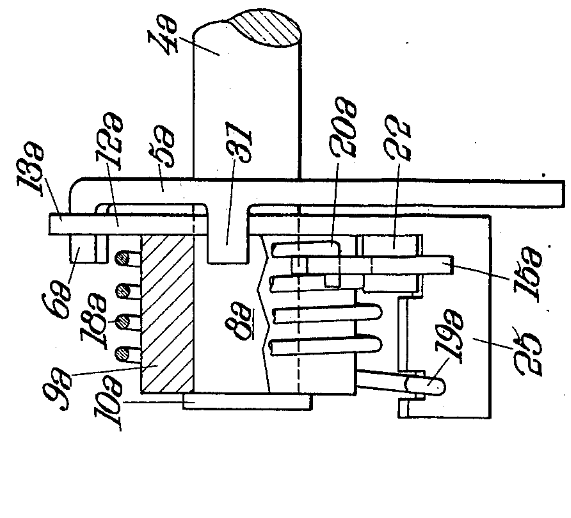

The modified embodiment illustrated in FIGS. 3 and 4 (in which for more clarity like elements to those illustrated in FIGS. 1 and 2 have like references followed by *a*) differs from the preceding embodiment mainly in the mounting of the second return spring.

Referring to FIGS. 3–4, the carburettor again comprises inter alia a butterfly **3*a*, shaft 4*a*, lever 5*a* having a finger 6*a*, and bush 9*a* fast with a disk 12*a*. However, lever 5*a* comprises a second abutment 31 the function of which will be explained hereinafter. While the disk 12*a* has abutment lugs 13*a*, 14*a*, the latter formed with a tab 25 at 90° in relation to the plane of the disk, it has no lug unitary therewith; in place of the lug, there provided a bell crank lever 15a rotating on a pivot 22 parallel with the shaft 4a and carried by an appendix 23 of the disk 12a. The first spring 17a therefore tends to rotate the lever 15a in a direction such that its arm 24 abuts the bent tab 25 of the disk 12a. The disk 12a and the lever 15a thus rotate en bloc as long as the spring 17a** is in place and operates correctly.

Again, a second spring 18a is wound around the bush 9a. The first end 19a of spring 18a bears against the bent tab 25 of the disk. Its second end 20a engages a notch 26 in the lever 15a.

The strength of the spring 18a and the ratio between the lengths of the arms of lever 15a are so selected that the spring 18a is not able to move the lever 15a clear of the bent tab 25 as long as the spring 17a exerts its normal return force.

The apparatus operates as follows: normally the return spring 17a and the accelerator control rotate the control lever and the disk en bloc, the spring 18a remaining locked in a prestressed condition. If the spring 17a breaks, the spring 18a rotates the lever 15a clockwise, tne end portion 20a snaps out of the notch 26 and abuts the stop finger 31. The other end 19a of the spring 18a then exerts on the bent tab 25 a force which moves the lever 5a into the position illustrated in chain dot lines in FIG. 3, that is into abutment against the fixed stop 21a. The spring 18a is then substituted for the spring 17a and exerts a return force against the stop finger 31.

The embodiment illustrated in FIGS. 3 and 4 has the advantage over that illustrated in FIGS. 1 and 2 that it provides an extra adjustment parameter (i.e., the ratio between the arms of the lever 15a). It has however the disadvantage of requiring a resetting of the spring 18a every time the spring 17a is replaced. A tool is required and there is the risk of the spring being forgotten. On the contrary, in the embodiment illustrated in FIGS. 1 and 2, the spring 18 remains in position and is automatically reset when a fresh spring 17 is attached.

I claim:

1. In a carburettor having an intake duct, an operator controlled rotary shaft carrying a throttle member, return means for biasing said shaft towards a minimum opening position of said throttle member, comprising:

- a lever plate transverse to said shaft being fixedly and non-rotatably connected to said shaft;
- a rotational member mounted for relative angular concentric rotation about the axis of said shaft;
- a first spring tensioned between said member and stationary attachment means and exerting on said member a force urging it angularly in the direction of closure of said throttle member;
- cooperating abutment means on said lever plate and rotational member for limiting the extent of relative angular movement of said rotational member and lever plate under the action of said first spring;
- a torsion spring compressed against said rotational member and exerting a torque tending to rotate it in a direction opposite to that due to said first spring and lower than the torque of said first spring;

- and stationary abutment means for limiting the extent of movement of said member under the action of said torsion spring upon failure of said first spring.

2. A carburettor according to claim 1, wherein said torsion spring is prestressed by said first spring between said member and shaft assembly.

3. A carburettor as set forth in claim 2, wherein said rotational member has a lug fast therewith and the first spring is attached to said lug.

4. A carburettor as set forth in claim 3, wherein said rotational member comprises a bush having a sliding fit on the shaft and the torsion spring is a helical spring wound around said bush, one end portion of said torsion spring bearing against said lug of the rotary member and the other end portion thereof bearing against a lug of the lever plate.

5. A carburettor as set forth in claim 4, wherein said lug constitutes said abutment means on said shaft assembly.

6. In a carburettor having an intake duct and an operator controlled rotary shaft assembly carrying a throttle member, resilient return means for biasing said shaft assembly towards a minimum opening position of said throttle member comprising:

- a disc mounted for relative angular concentric rotation about the axis of said shaft assembly;
- a lever pivotally connected to the disc about an axis parallel to the axis of the shaft;
- a first spring tensioned between one arm of said lever and stationary attachment means and exerting on said lever a force urging it angularly in the direction of closure of said throttle member, said first spring resiliently retaining the other arm of said lever against a stop formed on the disc;
- cooperating abutment means on said shaft assembly and disc for limiting the extent of angular movement of said disc and shaft under the action of said first spring;
- a second spring compressed against said disc and exerting a torque tending to rotate it in a direction opposite to that due to said first spring and lower than the torque of said first spring;
- and stationary abutment means for limiting the extent of movement of said disc under the action of said second spring upon failure of said first spring.

7. A carburettor as set forth in claim 6, wherein the second spring is a torsion spring wound on a bush connected to the disk and having a sliding fit on said shaft, one end of said torsion spring bearing against said disk of the rotary member, and the other end normally being retained by the lever when the latter is subject to the action of the first spring, and snapping free therefrom into abutment against means borne by said shaft assembly in the absence of the first spring.

8. A carburettor as set forth in claim 7, wherein the other end of said torsion spring is engaged in a notch in the lever for exerting a force thereon tending to rotate the lever out of abutment against the disk.

* * * * *